(12) United States Patent
Tsubusaki et al.

(10) Patent No.: US 9,578,251 B2
(45) Date of Patent: Feb. 21, 2017

(54) IMAGING APPARATUS AND CONTROL METHOD FOR THE SAME

(75) Inventors: Akihiro Tsubusaki, Yokohama (JP); Koki Kitaya, Kawasaki (JP); Eiji Yoshino, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 362 days.

(21) Appl. No.: 13/224,807

(22) Filed: Sep. 2, 2011

(65) Prior Publication Data

US 2012/0062692 A1 Mar. 15, 2012

(30) Foreign Application Priority Data

Sep. 13, 2010 (JP) ................................. 2010-204563
Mar. 30, 2011 (JP) ................................. 2011-074757

(51) Int. Cl.
*H04N 5/00* (2011.01)
*H04N 5/232* (2006.01)

(52) U.S. Cl.
CPC ................................. *H04N 5/23296* (2013.01)

(58) Field of Classification Search
CPC ................................................ H04N 5/23296
USPC ........................................................ 348/36
See application file for complete search history.

(56) References Cited

U.S. PATENT DOCUMENTS

| 5,319,411 | A |   | 6/1994  | Ishibashi et al. |
|---|---|---|---|---|
| 5,376,993 | A | * | 12/1994 | Kubota et al. ............ 348/208.99 |
| 5,867,217 | A | * | 2/1999  | Okino et al. ............. 348/240.99 |
| 5,907,724 | A | * | 5/1999  | Uno et al. ......................... 396/82 |
| 6,272,289 | B1 | * | 8/2001  | Washisu ........................... 396/55 |
| 6,522,838 | B1 |   | 2/2003  | Natsume et al. |
| 6,721,004 | B1 |   | 4/2004  | Kato |
| 7,362,966 | B2 |   | 4/2008  | Uchiyama |
| 7,551,200 | B2 |   | 6/2009  | Okada et al. |
| 7,876,373 | B2 |   | 1/2011  | Ochi et al. |
| 8,570,391 | B2 |   | 10/2013 | Shimamura et al. |
| 2005/0063693 | A1 |   | 3/2005  | Yoshibe et al. |

(Continued)

FOREIGN PATENT DOCUMENTS

| CN | 1655002 A | 8/2005 |
|---|---|---|
| CN | 1943226 A | 4/2007 |

(Continued)

OTHER PUBLICATIONS

Dec. 3, 2013 Chinese Office Action, issued in Chinese Patent Application No. 2011 10272236.7.

(Continued)

*Primary Examiner* — Jeffery Williams
(74) *Attorney, Agent, or Firm* — Cowan, Liebowitz & Latman, P.C.

(57) ABSTRACT

A digital camera includes a zoom function for supporting a user when performing a frame assist, and includes an operation switch for instructing startup and completion of the zoom function on an operation unit. A system control unit stores a zoom position in a memory and varies the zoom position in a wide angle position according to a preset zoom-out drive amount when an instruction to startup the zoom function is given by the operation switch. Then, when the instruction to end the zoom function is given by the operation switch, the system control unit executes a zoom-in operation by returning to the zoom position that is stored in the memory.

28 Claims, 12 Drawing Sheets

(56) References Cited

U.S. PATENT DOCUMENTS

| | | |
|---|---|---|
| 2006/0023091 A1* | 2/2006 | Uchiyama ............... 348/240.1 |
| 2006/0050982 A1* | 3/2006 | Grosvenor ............... 382/255 |
| 2006/0171703 A1* | 8/2006 | Abe et al. ............... 396/311 |
| 2009/0268079 A1 | 10/2009 | Motomura et al. |
| 2010/0245630 A1 | 9/2010 | Kurokawa |
| 2011/0001847 A1* | 1/2011 | Iwasaki ............... H04N 5/23296 348/240.3 |

FOREIGN PATENT DOCUMENTS

| | | |
|---|---|---|
| JP | 63-187210 A | 8/1988 |
| JP | 01-106586 A | 4/1989 |
| JP | 04-171431 A | 6/1992 |
| JP | 04-373368 | 12/1992 |
| JP | 08-018833 A | 1/1996 |
| JP | 11-271592 A | 8/1999 |
| JP | 11-289486 A | 10/1999 |
| JP | 2001-74999 A | 3/2001 |
| JP | 2001-117153 | 4/2001 |
| JP | 2004-32524 A | 1/2004 |
| JP | 2006-014221 A | 1/2006 |
| JP | 2006-19852 A | 1/2006 |
| JP | 2006-050019 | 2/2006 |
| JP | 2008-096584 A | 4/2008 |
| JP | 2009-182547 A | 8/2009 |
| JP | 2010-147808 A | 7/2010 |

OTHER PUBLICATIONS

Jun. 10, 2014 Japanese Office Action, issued in Japanese Patent Application No. 2010-204563.
Jun. 16, 2015 Japanese Office Action, issued in Japanese Patent Application No. 2014-193229.
Dec. 16, 2014 Japanese Office Action, issued in Japanese Patent Application No. 2011-074757.
Nov. 1, 2016 Japanese Office Action, issued in Japanese Patent Application No. 2016077008.

* cited by examiner

IMAGING APPARATUS AND CONTROL METHOD FOR THE SAME

BACKGROUND OF THE INVENTION

Field of the Invention

The present invention relates to zoom control in an imaging apparatus used for still images or moving images. Furthermore, the present invention relates to an imaging apparatus including an optical zoom function and an electronic zoom function.

Description of the Related Art

An imaging apparatus such as a digital camera or the like includes an optical magnification variation (optical zoom) function configured by driving of a zoom lens, and an electronic magnification variation (electronic zoom) function in which a portion of an image field is enlarged. In recent years, improvements to zoom lens performance have enabled imaging with the same lens from super-wide angle to super-telephoto, and increased pixilation in the image sensor has enabled imaging with sufficient resolution characteristics even at an enlarged magnification.

On the other hand, a so-called preset zoom function and a shuttle-shot zoom function are known as functions that enable high-speed movement to the angle of view used during imaging. The preset zoom function is a function for moving from an arbitrary zoom position to a zoom position that is pre-stored in a memory by operation of a switch by a user. In addition, the shuttle-shot zoom function is a function for enhance the preset zoom function, and has a function of returning to an original zoom position. In other words, when the user operates a switch, zooming is executed from an arbitrary zoom position to a zoom position that is pre-stored in a memory, and at that time, the original zoom position is stored in the memory to thereby enable returning to the original zoom position upon completion of the preset zoom operation.

Although enlarged imaging of a distant subject is possible by use of an optical zoom function or an electronic zoom function, there is a tendency for the subject to diverge from the angle of view as a result of movement by the subject or due to strong camera shake caused by the user. In this situation, a function has been proposed for re-entering the subject into the angle of view. For example, a function has been proposed in which an optical zoom or an electronic zoom are driven in a wide-angle configuration by a predetermined amount as a result of pressing a specific button when the subject deviates from the angle of view. In this manner, the widening of the angle of view facilitates searching for the subject that was previously lost from view. When the subject is relocated, a panning operation is executed with the camera so that the subject is placed in the center of the angle of view, and then the button is released from the depressed state. In this manner, the optical zoom or electronic zoom is driven in a telephoto direction and then returned to the original angle of view.

When an FA zoom operation switch is pressed during execution of an optical zoom in the telephoto direction and an enlargement with the electronic zoom, firstly, the enlargement of the electronic zoom is released. After completely releasing the enlargement by the electronic zoom, the optical zoom is driven in the wide-angle direction, and stopped at a predetermined zoom position. When the FA zoom operation switch is released at that position, firstly, the optical zoom is driven in the telephoto direction. Then, when the optical zoom has reached the telephoto direction, enlargement with the electronic zoom is performed, and the operation is stopped at the original angle of view. There is a need during a framing assist for rapid relocation of an subject that has been lost from view. Furthermore, there is a need to rapidly return to the original angle of view after relocation of the subject so that the photo opportunity is not lost. Therefore, the speed of the zoom drive during framing assist must be increased.

Japanese Patent Laid-Open No. 2006-50019 discloses a control apparatus related to a preset zoom function and a shuttle-shot zoom function. This apparatus enables a memory zoom operation with respect to the optical zoom area and the electronic zoom area from a first zoom state in a first zoom area to a second zoom state which is a second zoom area stored in a storage unit. The apparatus disclosed in Japanese Patent Laid-Open No. 2001-117153 enables the use of different fingers when operating a first operation member for selection of a storage operation on a zoom position by the preset zoom function and a replay operation to the stored zoom position, and a second operation member for execution of an operation that is selected by the first operation member.

Japanese Patent Laid-Open No. 04-373368 discloses a method of driving the optical zoom and the electronic zoom at the same time when a zoom speed must be greater than the drive speed of an optical zoom.

The image apparatus provided with a super-high magnification zoom function may undergo a frame-out due to slight movement of the subject when adjusting the angle of view in a super-telephoto state. Furthermore, even when a user performs a small panning operation with the camera, the scope of the angle of view will undergo a large change. Under this type of super-telephoto condition, it is difficult to execute framing of a moving subject into a desired angle of view.

The preset zoom function and the shuttle-shot zoom function disclosed in Japanese Patent Laid-Open No. 2006-50019 and Japanese Patent Laid-Open No. 2001-117153 require storage of the zoom position in a memory after the user performs an operation of moving the zoom position to the desired zoom position for imaging. As a result, when tracking and imaging an subject that is moving and is out of frame, or when there is a change in the size of the subject, time is required to update the stored details in relation to the zoom position, and there is the possibility that the user will lose the photo opportunity. Furthermore, the conventional technique disclosed in Japanese Patent Laid-Open No. 2001-117153 requires user training in relation to operating methods in order to image the subject to be image at a predetermined size while tracking an subject that is out of frame. This operation requires storage of the zoom position while repeating the zoom operation with a plurality of operation members.

Furthermore, the technique disclosed in Japanese Patent Laid-Open No. 2001-117153 may cause deterioration in image quality due to an enlargement by the electronic zoom even when the optical zoom is not at the telephoto end.

SUMMARY OF THE INVENTION

The imaging apparatus according to the present invention provides an apparatus, and a control method therefor, that enable imaging at a desired angle of view and enable the user to instantly adjust capture of the subject even when the subject is out of frame. The imaging apparatus according to the present invention further provides an apparatus for increasing the zoom driving speed without executing an unnecessary electronic zoom during a framing assist.

In order to solve the above problems, the apparatus according to the present invention is an imaging apparatus that has a zoom function to support framing, and includes an operation instruction unit configured to instruct startup and completion of a zoom function, a storing unit configured to store a zoom position, a drive unit configured to drive a zoom, and a control unit configured to control the drive unit. The control unit executes a return operation to the zoom position stored in the storing unit when the startup of the zoom function is instructed by the operation instruction unit, or when the zoom position is stored in the storing unit, the zoom position is changed by the drive unit in a wide-angle direction, and the completion of the zoom function is instructed by the operation instruction unit.

The apparatus according to the present invention further includes an imaging apparatus that has a zoom operation instruction unit configured to instruct an operation in a zoom-out direction and a zoom-in direction, and has a zoom function to support framing. The imaging apparatus includes an operation instruction unit configured to instruct startup and completion of a zoom function, a storing unit configured to store a zoom position, a drive unit configured to drive a zoom, and a control unit configured to control the drive unit. The drive unit includes an optical zoom unit configured to drive a zoom lens and executing an optical variation of the focal distance, and an electronic zoom unit configured to electronically enlarge the captured image. The control unit controls the optical zoom unit and the electronic zoom unit so that during operation of the zoom operation instruction unit, zoom driving is executed only by the optical zoom unit from the wide-angle end to the telephoto end, and zoom driving is executed only by the electronic zoom unit after the telephoto end. During operation of the operation instruction unit, the optical zoom drive and the electronic zoom drive are controlled so that the optical zoom drive and the electronic zoom drive are driven to an optical zoom position and an electronic zoom position that correspond to the predetermined zoom position.

The present invention enables imaging in a desired angle of view by enabling the user to instantly adjust capture of the subject even when the subject is out of frame.

The present invention enables an increase in the zoom driving speed without executing an unnecessary electronic zoom when startup of the zoom function is instructed by the operation instruction unit.

Further features of the present invention will become apparent from the following description of embodiments with reference to the attached drawings.

BRIEF DESCRIPTION OF THE DRAWINGS

FIG. 12-1B illustrates the relationship between magnification and time during zooming by operation of an FA zoom operation switch.

FIG. 12-2C is another view illustrating the relationship between magnification and time during zooming by operation of the FA zoom function switch.

FIG. 12-2D is yet another view illustrating the relationship between magnification and time during zooming by operation of the FA zoom function switch.

FIG. 12-3 is yet another view illustrating the relationship between magnification and time during zooming by operation of the FA zoom function switch.

DESCRIPTION OF THE EMBODIMENTS

The embodiments of the present invention will be described in detail below making reference to the attached figures. Note that the function realized by the present invention is a zoom function for supporting framing by a user, and for the sake of convenience, will be termed herein a "framing assist zoom function" (hereinafter abbreviated to "FA zoom function").

Figure 1:
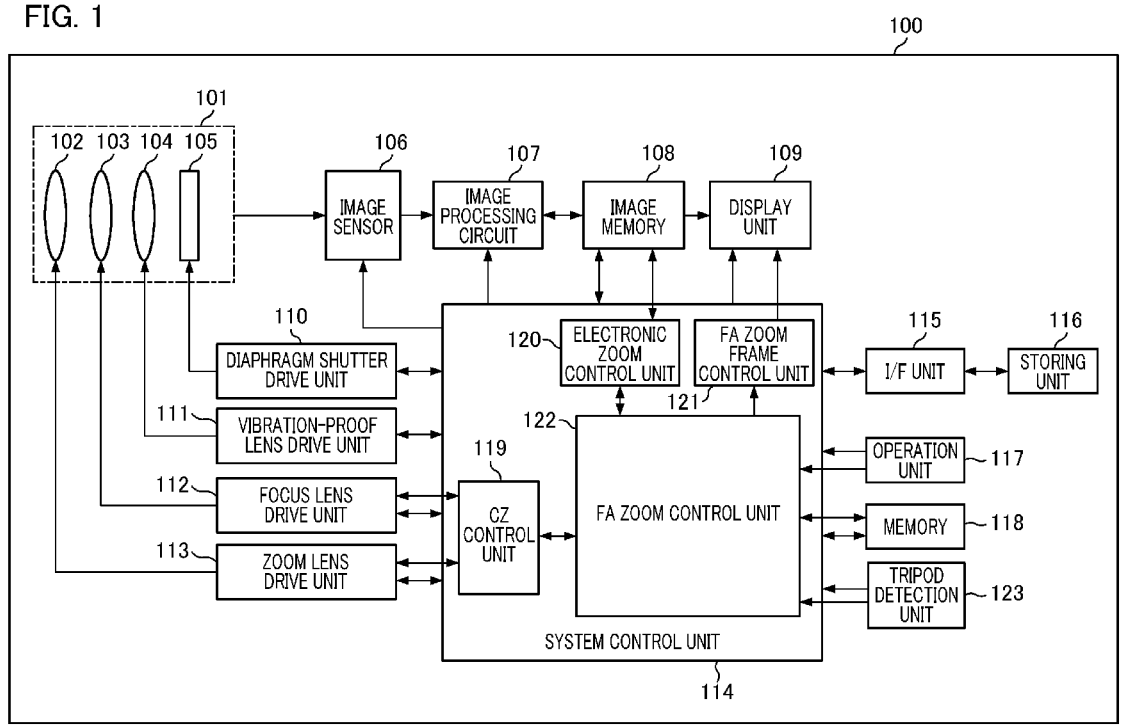
FIG. 1 illustrates a block diagram of an example of the configuration of a digital camera according to an embodiment of the present invention.

FIG. 1 illustrates a block diagram of an example of the configuration of a digital camera 100 as an example of an imaging apparatus according to the present embodiment. A lens group is supported in an inner portion of a lens barrel 101 for driving of the lens. A zoom lens 102 optically varies the angle of view by adjusting the focal distance, and the focus lens 103 adjusts the focus. A vibration-proof lens 104 is a correcting lens for correcting camera shake. A diaphragm and shutter 105 for adjusting the amount of light is used for exposure control. Light that passes through the lens barrel 101 becomes incident upon an image sensor 106 that employs a CCD (charge-coupled device), a CMOS (complementary metal-oxide semiconductor) or the like, and is converted from an optical signal to an electrical signal. An electrical signal is input into an image processing circuit 107, subjected to a pixel interpolation process, a color conversion process or the like, and then transmitted as image data to the image memory 108. The image memory 108 is a DRAM (dynamic random access memory), a SRAM (state random access memory), or the like.

A display unit 109 is configured from a TFT-type LCD (thin-film transistor liquid crystal display) or the like, and displays captured image data together with specific information (for example, image information, a FA zoom frame or the like as described below). An electronic viewfinder (EVF) function by which the user adjusts the angle of view is realized by information display on this type of live view or the like.

A diaphragm shutter drive unit 110 calculates an exposure control value (diaphragm value and shutter speed) based on the luminance information obtained by image processing in the image processing circuit 107, and drives the diaphragm and shutter 105 based on the calculation result. In this manner, automatic exposure (AE) control is performed. The vibration-proof lens drive unit 111 uses the information of respective speed sensors, such as a gyro sensor or the like, to calculate a camera-shake amount applied to the digital camera 100, and drives the vibration-proof lens 104 to cancel out the shaking.

A focus lens drive unit 112 drives the focus lens 103. For example, when using a contrast AF (auto-focus) method of control, focus adjustment information (contrast evaluation values) of the imaging optical system obtained by image processing by the image processing circuit 107 is used to drive the focus lens 103 and thereby align the focus on the subject. Since application of the present invention is not dependent upon the focus adjustment control, a combination with a phase-differential AF method or other method can be employed. The zoom lens drive unit 113 drives the zoom lens 102 according to the zoom operation instructions. A zoom lever or zoom button or the like is provided in an operation unit 117 as a zoom operation member for the user to instruct the camera to execute a zoom operation. The zoom drive speed or drive direction is calculated based on the operation amount or operation direction of the zoom operation switch that is used for zoom operation instructions, and the zoom lens 102 displaces along the optical axis according to the calculation result.

Image data produced by the imaging operation is transmitted and recorded through an interface (I/F) unit 115 in the recording unit 116. The image data is recorded in an external recording medium such as a memory card or the like that is attached to the camera, in a non-volatile memory 118 that is stored in the digital camera 100, or in both.

In addition to the zoom operation switch, the operation unit 117 includes a release switch that instructs imaging startup, an FA zoom operation switch that instructs startup or completion of the FA zoom function, or the like. An operation signal is sent to the system control unit 114 described below. In addition to program data, image data, or the like, the memory 118 stores information such as setting information for the digital camera 100, information for the zoom return position or the like in relation to the FA zoom function described below. The zoom return position is the return position when returning to the startup zoom position upon completion of a FA zoom, and will be described in further detail hereafter.

The system control unit 114 is configured from a calculation apparatus such as a central processing apparatus (CPU), or the like, and controls the overall camera operation by sending control commands to respective units in response to user operations. The system control unit 114 executes various types of control programs stored in the memory 118, for example, programs for control of the image sensors 106, or AE/AF control, zoom control (including FA zoom processing), or the like.

Next, the control related to the FA zoom function will be described with reference to the system control unit 114. FIG. 1 illustrates the internal processing of the system control unit 114 as a function block of control units 119 to 122.

Figure 2:
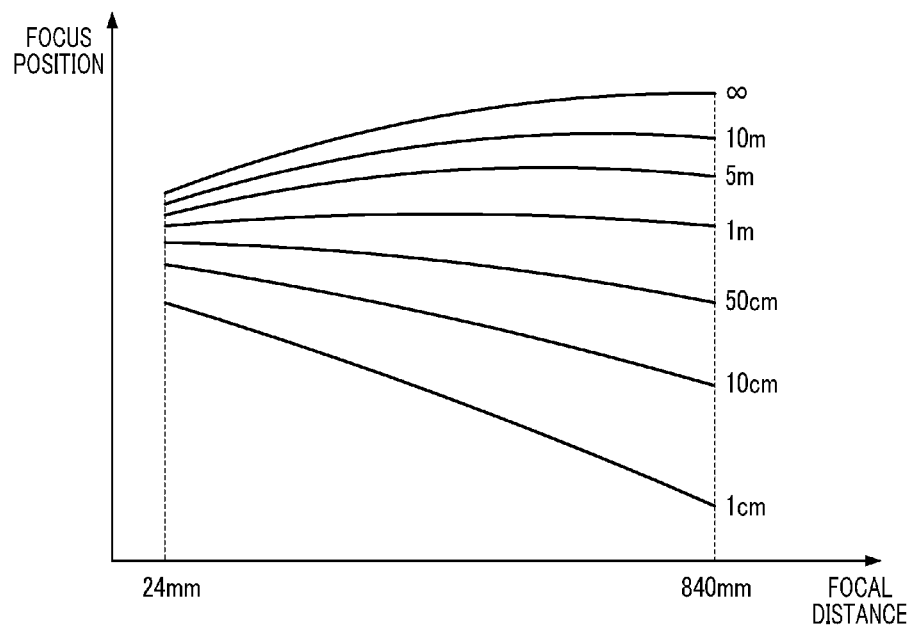
FIG. 2 illustrates an example of the relationship between the focal length and the focus lens position at each distance to the subject.

In order to maintain the focus configuration even when the angle of view is varied by use of the optical zoom, the focus lens 103 must be displaced to a suitable focal position in response to the position of the zoom lens 102 when using a rear-focus type lens barrel as shown by the lens barrel 101. This type of control is termed computer zoom (CZ) control. FIG. 2 is a graphical representation of a data table illustrating the relationship between the focal distance of the zoom lens and the focus lens position when in focus for each distance to the subject. This table is termed a focus cam table. The horizontal axis shows the focal distance corresponding to the zoom lens position, and the vertical axis shows the focus position. The horizontal direction of each line in the graph expresses the distance (distance to subject) from the camera to the subject. The system control unit 114 controls the focus lens drive unit 112 during AF operation to thereby move the focus lens 113 within a predetermined range and execute a scan operation. The focus lens position, that is the in-focus point, is detected by a known method using a contrast evaluation value or the like obtained during the scan operation. The distance to subject can be measured with reference to the focus cam table using the zoom lens position and the focus lens position at that time.

The digital camera 100 includes an optical zoom function and an electronic zoom function. The CZ control unit 119 and the zoom lens drive unit 113 correspond to the optical zoom drive. The CZ control unit 119 detects the position of the zoom lens 102 at each predetermined control cycle during a zoom operation, and drives the focus lens 103 to conform to the focus cam table at a distance to subject that is measured by an AF operation corresponding to the lens position. In this manner, an optical zoom operation can be performed while maintaining the in-focus state.

The electronic zoom control unit 120 and the image memory 108 realize the electronic zoom drive. The electronic zoom control unit 120 realizes an electronic zoom function by extracting a subject region from the image data transferred to the image memory 108. In addition, the extracted range gradually increases with the frame rate cycle of the image taken by the image sensor 106, and is displayed on the display unit 109 to thereby realize a smooth electronic zoom display.

Next, the overview of the FA zoom function and the FA zoom frame control unit 121 and the FA zoom control unit 122 will be described. Typically, a user has been required to execute the following operation when the subject moves out of frame when the user is preparing a photo opportunity by framing in a telephoto configuration.

Search for the subject by executing a zoom-out by operation of the zoom operation switch.

Adjust the angle of view by a zoom operation until a desired angle of view is reset.

In contrast, the digital camera 100 that includes an FA zoom function enables the user to operate the FA zoom switch when the subject becomes lost from view during alignment of the angle of view prior to imaging (hereinafter referred to as "imaging preparation state"). The FA zoom operation switch allocated to the FA zoom function, and when a member other than the operation member of the zoom operation switch is depressed, the camera is instructed to startup the FA zoom function. The FA zoom control unit 122 stores the respective zoom positions of the electronic zoom and the optical zoom in the memory 118 when a startup command is outputted from the FA zoom operation switch. The FA zoom control unit 122 instructs the CZ control unit 119 or the electronic zoom control unit 120 to execute a zoom-out operation in accordance with the processing sequence illustrated in FIG. 4 described below so that the angle of view is more in a zoom-out state than an imaging preparation state (hereinafter referred to as "subject searching state").

Figure 3A:
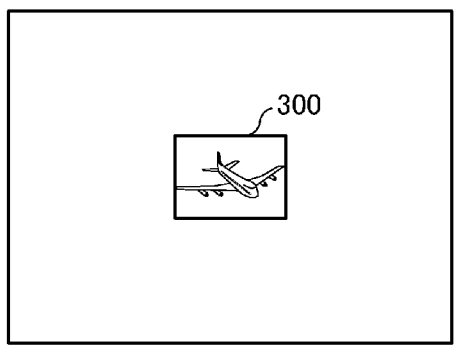
FIG. 3A illustrates an example of an angle of view during a subject searching state.
Figure 3B:
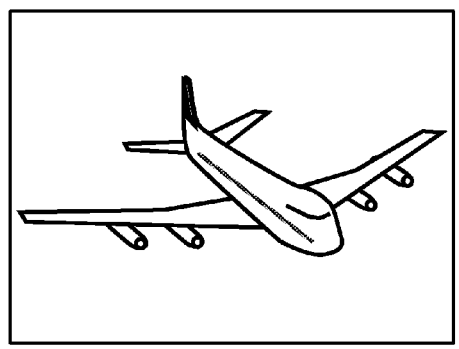
FIG. 3B illustrates an example of an angle of view during an imaging preparation state.

FIG. 3A illustrates the angle of view in a zoom-out state, and FIG. 3B illustrates the angle of view in a zoom-in state. As illustrated in FIG. 3A, the FA zoom frame control unit 121 calculates the size of the angle of view in the stored imaging preparation state, and displays the frame 300 in a central portion of the EVF of the display unit 109, that is to say, the FA zoom frame is displayed. The size of the FA zoom frame 300 is calculated based on the zoom magnification when executing a zoom-out. For example, when an subject searching state is a zoom-out with an electronic zoom magnification from the imaging preparation state of 2× and an optical zoom magnification of 3×, an FA zoom frame with a size of (½)×(⅓)=⅙× is displayed with respect to the angle of view displayed on the EVF during the subject searching state.

The zoom-out state is maintained while the FA zoom operation switch is depressed. When the user locates the desired subject in the subject searching state, framing is executed with reference to the FA zoom frame 300 to thereby converge the subject into the FA zoom frame. Thereafter, when the user releases the FA zoom operation switch and instructs the camera to end FA zooming, the FA zoom control unit 122 executes a zoom-in operation with the optical zoom or the electronic zoom to the stored zoom position in the imaging preparation state. This processing enables the user to employ a simple operation to image an subject that has moved out of frame at a desired angle of view while re-performing a frame-in operation.

First Embodiment

Next, a processing example of the FA zoom function will be described with reference to FIG. 4.

In S100, the FA zoom control unit 122 determines whether or not the FA zoom operation switch of the operation unit 117 is depressed in an imaging preparation state. When depression of the FA zoom operation switch is detected, the FA zoom process is started. In S101, the FA zoom control unit 122 acquires the optical zoom position in the imaging preparation state from the CZ control unit 119, and acquires the electronic zoom position from the electronic zoom control unit 120. Then, the FA zoom control unit 122 stores the data for the optical zoom position and the electronic zoom position in the memory 118. The optical zoom position represents the position of a zoom lens corresponding to the zoom magnification that can be varied by the optical zoom function, and the electronic zoom position represents the control position that corresponds to the demagnification and image enlargement that can be varied by the electronic zoom function.

In S102, the FA zoom control unit 122 acquires a zoom-out drive amount that is stored in the memory 118. The zoom-out drive amount can be varied by the user executing an operation on the settings menu. In this case, the operation unit 117 and the display unit 109 configure a setting unit for the zoom-out drive amount. In the present example, although a zoom-out operation is executed as described below in accordance with a preset zoom-out drive amount, configurations may include the FA zoom control unit 122 executing stepwise control of the operation, or a zoom-out operation that continues until the user executes a stop operation. In S103, the FA zoom control unit 122 determines whether or not the zoom state in the imaging preparation state is an electronic zoom state. When the zoom operation switch of the operation unit 117 is depressed in a general zoom operation, the optical zoom is driven under the control of the CZ control unit 119 when the optical zoom is positioned in the interval from the wide end to the telephoto end. When the optical zoom position is the telephoto end and an operation instruction towards the telephoto direction is executed, the electronic zoom control unit 120 enables super-telephoto imaging by driving the electronic zoom. Consistency between the FA zoom operation and a zoom operation due to operation of the zoom operation switch is attained by driving the electronic zoom in advance, even during an FA zoom operation, when an electronic zoom state applies in the imaging preparation state. That is to say, it is determined whether or not the zoom position at the time of storage in the memory 118 is in the zoom region corresponding to a priority zoom state. In the present example, since the electronic zoom is given priority, in S103, it is determined whether or not the zoom position is in an electronic zoom region. When the zoom state at startup of the FA zoom is in an electronic zoom state, the processing proceeds to S104. In S104, the FA zoom control unit 122 calculates the zoom-out position of the electronic zoom from the zoom-out drive amount acquired in S102 and the electronic zoom position acquired in S101 in accordance with a calculation method for the zoom-out position described below, and thereby sets the position in the electronic zoom control unit 120. In S105, the FA zoom control unit 122 instructs the electronic zoom control unit 120 to vary the magnification to the zoom-out position of the electronic zoom set in S104. The electronic zoom control unit 120 executes the zoom-out operation with the electronic zoom.

When it is determined that the zoom position in the imaging preparation state in S103 is in the optical zoom region, or after execution of the zoom-out operation by the electronic zoom in S105, the processing proceeds to S106. In S106, the FA zoom control unit 122 determines whether or not a zoom-out using the optical zoom is also necessary. That is to say, when the zoom driving for the set zoom-out driving amount is insufficient when using only the electronic zoom, it is necessary to supplement the residual zoom-out driving amount by use of the optical zoom (the calculation of the residual driving amount will be described below). When it is determined that it is necessary to execute a zoom-out using the optical zoom, the processing proceeds to S107, and when a zoom out using the optical zoom is not necessary, the processing proceeds to S109. In S107, the FA zoom control unit 122 calculates the zoom-out position of the optical zoom from the zoom-out driving amount and the optical zoom position in accordance with the method of calculation described below, and sets the value in the CZ control unit 119. In S108, the FA zoom control unit 122 instructs the CZ control unit 119 to drive the zoom to the zoom-out position of the optical zoom set in S107. The CZ control unit 119 controls the zoom lens driving unit 113, and executes a zoom-out operation on the optical zoom. Then the processing proceeds to S109.

In S109, the FA zoom control unit 122 instructs the FA zoom frame control unit 121 to display the FA zoom frame in response to the zoom-out magnification, and adopts a subject searching state. In S110, the FA zoom control unit 122 determines whether or not the FA zoom operation switch of the operation unit 117 in a subject searching state is released and placed in the OFF state. When the FA zoom control unit 122 detects that the FA zoom operation switch is in the OFF state, the FA zoom completion operation from S111 is started. In S111, the FA zoom control unit 122 reads data for the zoom position (zoom return position) stored in S101 from the memory 118. In S112, the FA zoom control unit 122 determines whether or not the zoom state in the subject searching state is an optical zoom state. When in an optical zoom state (YES in S112), the processing proceeds to S113 to prioritize the optical zoom and execute a zoom-in. When in an electronic zoom state (NO in S112), the processing proceeds to S115 to execute a zoom-in only by use of the electronic zoom. In S113, the FA zoom control unit 122 sets the zoom-in position for the optical zoom in the CZ control unit 119 from among the zoom return positions read in S111. In S114, the FA zoom control unit 122 instructs the CZ control unit 119 to drive the zoom lens 102 to the zoom-in position with the optical zoom as set in S113. The CZ control unit 119 controls the zoom lens drive unit 113, and executes a zoom-in operation with the optical zoom.

In S112, when it is determined that the zoom position in the subject searching state is in the electronic zoom region, or after a zoom-in operation is executed using the optical zoom in S114, the processing proceeds to S115. In S115, the FA zoom control unit 122 determines whether or not there is a need for a further zoom-in using the electronic zoom. When it is determined that a zoom-in using the electronic zoom is required, the processing proceeds to S116. When it is determined that a zoom-in using the electronic zoom is not required, processing enters an imaging preparation state and processing is thereby ended. In S116, the FA zoom control unit 122 sets the zoom-in position using the electronic zoom in the electronic zoom control unit 120 from among the zoom return positions read in S111. In S117, the FA zoom control unit 122 instructs the electronic zoom control unit 120 to vary the magnification to the electronic zoom zoom-in position that was set in S116. The electronic zoom control unit 120 executes the electronic zoom-in operation, and thereby returns to the zoom return position. When this operation is ended, the imaging preparation state is configured, and processing is ended.

Next, the calculation method of the zoom-out position of the electronic zoom and the optical zoom set in S104 and S107 in FIG. 4 will be described using FIGS. 5A and 5B. FIG. 5A describes a zoom-out operation when using a continuous quantity based on the zoom magnification to set the zoom-out drive amount. In this example, the optical zoom magnification in the range in which the focal distance of the optical zoom is from 24 to 840 mm is taken to be a maximum of 35×, and the electronic zoom magnification has a maximum of 4×. The zoom-out drive amount is converted to a zoom magnification of 1/8×. Note that the terms "optical wide end" and "optical telephoto end" in the figure respectively indicate the wide end (focal distance 24 mm) and the telephoto end (focal distance 840 mm) in the optical zoom operation, and indicate the field of the optical zoom region. The terms "electronic wide end" and "electronic telephoto end" respectively indicate the wide end (corresponding to a focal distance of 840 mm) and the telephoto end (corresponding to a focal distance of 3360 mm) in the electronic zoom operation, and indicate the field of the electronic zoom region. The optical telephoto end position corresponds to the electronic wide end position.

The pattern 1 shows the zoom-out position when the zoom position in the imaging preparation state has a focal length of 840 mm at the optical telephoto end position. The zoom state at the imaging preparation state is an optical zoom state, and therefore, the electronic zoom position remains at an electronic wide end position. When the optical zoom position is varied by the zoom-out drive amount corresponding to a 1/8× zoom magnification, the position corresponding to a focal length of 840 mm×(1/8×)=105 mm becomes the zoom-out position.

The pattern 2 shows the zoom-out position when the zoom position in the imaging preparation state has a focal length of 192 mm at the optical middle position. The zoom-out position of the optical zoom at that time is an optical wide end position corresponding to a focal distance of 192 mm×(1/8×)=24 mm.

The pattern 3 shows the zoom-out position when the zoom position in the imaging preparation state has a focal length of 72 mm at the optical middle position. The calculation result for the zoom-out position of the optical zoom is 72 mm×(1/8×)=9 mm, and is positioned more toward the wide angle position than the optical wide end position. In this case, the optical wide end position is determined as the zoom-out position.

The pattern 4 shows the zoom-out position when the zoom position in the imaging preparation state is the electronic telephoto end position. Since the electronic zoom magnification is a maximum of 4×, the zoom-out position of the electronic zoom is determined as the electronic wide end position, and the zoom-out operation using the optical zoom is executed in relation to the remaining two sections. Therefore, the zoom-out position using the optical zoom is a position corresponding to a focal distance of 840 mm×(1/2×) =420 mm.

When the zoom-out drive amount is set based on the zoom magnification, the size of the FA zoom frame in a subject searching state is fixed, with the exception of the case in which the zoom-out position exceeds the optical wide end position as in pattern 3. That is to say, the advantage is obtained that the angle of view after zoom-out has the same magnification.

Figure 5A:
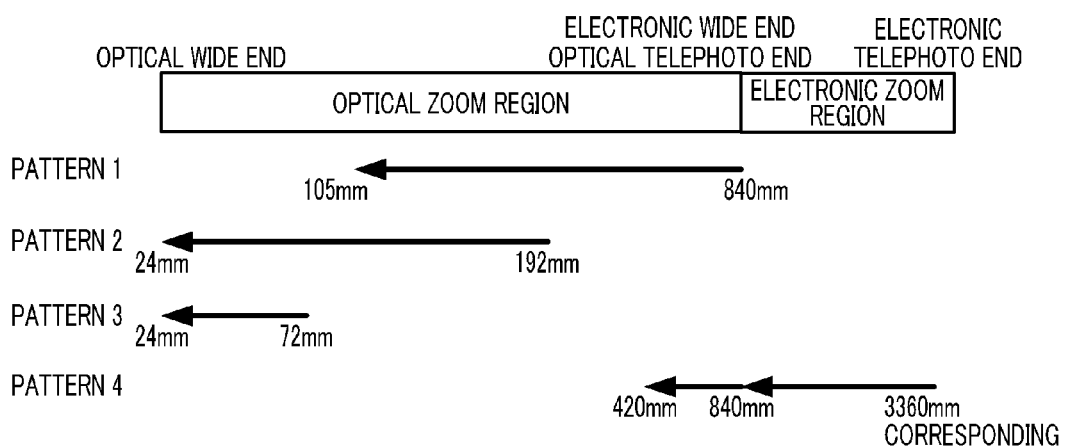
FIG. 5A describes a method of calculating a zoom-out position by the electronic zoom and the optical zoom.
Figure 5B:
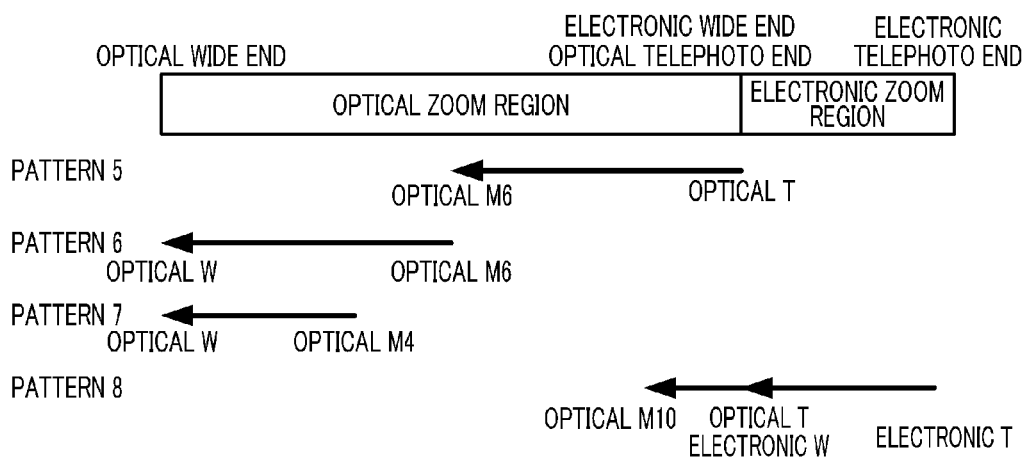
FIG. 5B describes a method of calculating a zoom-out position by the electronic zoom and the optical zoom.

FIG. 5B describes a zoom-out operation when using a zoom step number to set the zoom-out drive amount. A zoom step number is a stop-divided zoom number for a step zoom function which stops only at stepwise determined zoom positions, and therefore the zoom position is expressed by a discrete amount. In the present example, the number of steps in the optical zoom is 13 steps including the optical W (wide), the optical M1 to 11, and the optical T (telephoto). The optical W corresponds to the optical M0, and the optical T corresponds to the optical M12. Furthermore, the step number for the electronic zoom is four steps including the electronic W (wide), the electronic M1 and M2, and the electronic T (telephoto). The electronic W corresponds to the electronic M0, and the electronic T corresponds to the electronic M3. The zoom-out drive amount has six steps.

The pattern 5 shows the zoom-out position when the zoom position in the imaging preparation state is the optical telephoto end position (=electronic wide end position). Since the zoom state in the imaging preparation state is an optical zoom state, the electronic zoom remains at the electronic wide end position. The optical zoom position is the optical T (=M12), and the M12-6 (steps)=M6 position becomes the zoom-out position.

The pattern 6 shows the zoom-out position when the zoom position in the imaging preparation state is the optical middle position M6. The zoom-out position for the optical zoom at this time becomes M6-6 (steps)=M0, and the optical wide end (optical W) position is determined as the zoom-out position.

The pattern 7 shows the zoom-out position when the zoom position in the imaging preparation state is the optical middle position M4. The calculation of the zoom-out position for the optical zoom takes the form of M4-6 (steps)=M (−2), and the zoom-out position is positioned more toward the wide angle position than the optical wide end position.

In this case, the optical wide end (optical W) position is determined as the zoom-out position.

The pattern 8 shows the zoom-out position when the zoom position in the imaging preparation state is the electronic telephoto end position (electronic T). The step number for the electronic zoom is a maximum of four steps, and therefore the zoom-out position for the electronic zoom is taken to be the electronic wide end position, and a zoom-out operation is executed with the optical zoom in relation to the remaining two steps. Therefore, the zoom-out position of the optical zoom becomes M12-2(steps)=M10.

When the zoom-out drive amount is set with reference to a zoom step number, basically, the advantage of simple calculation is obtained since it is possible to calculate the zoom-out position by use of only a subtraction calculation.

Figure 4:
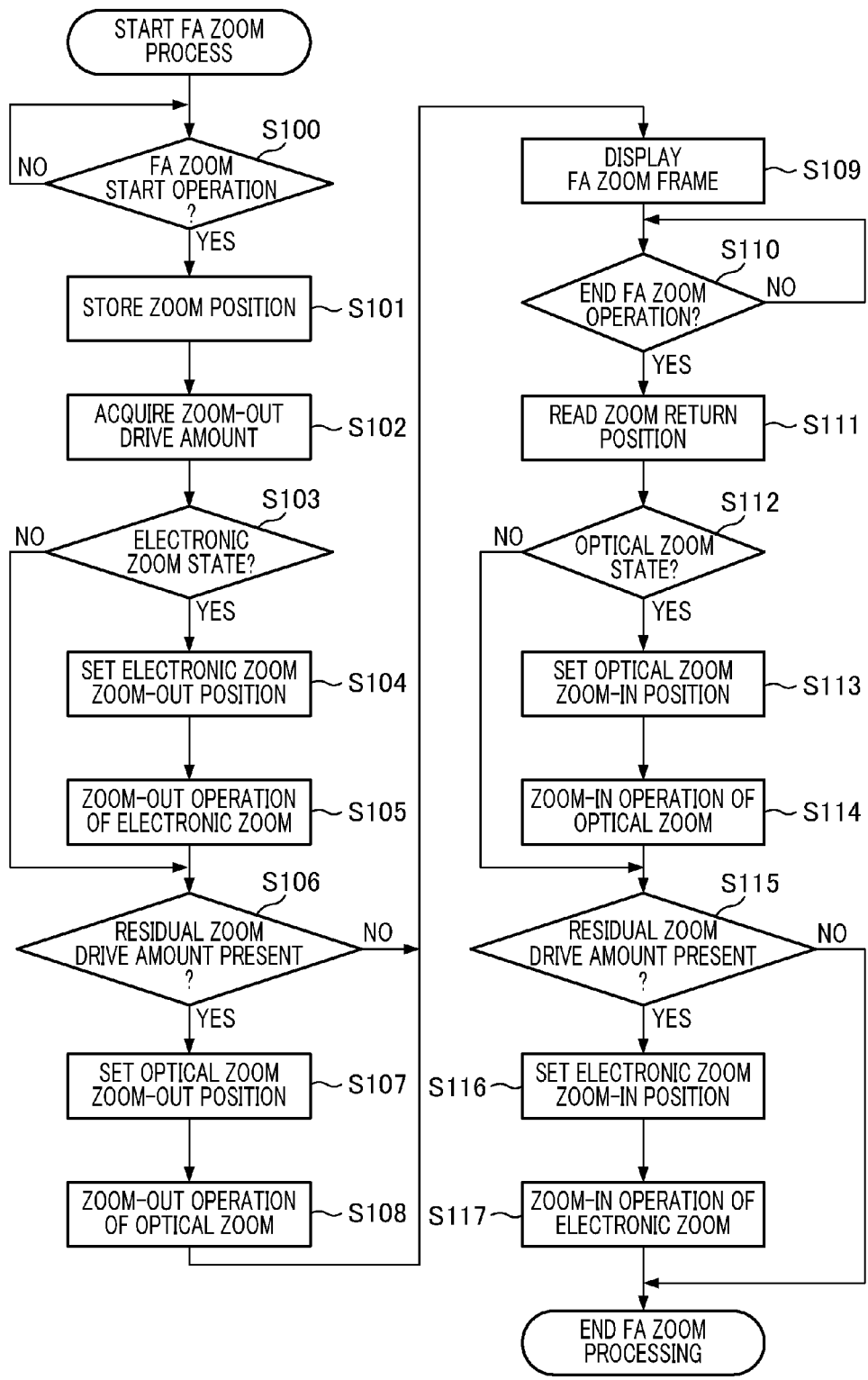
FIG. 4 is a flowchart describing a processing example of a zoom function according to an embodiment of the present invention.

The calculation of the zoom-in position executed in S113 and S116 in FIG. 4 can also be performed as described above with the exception that the optical zoom has priority, and therefore such description will not be repeated.

Figure 6:
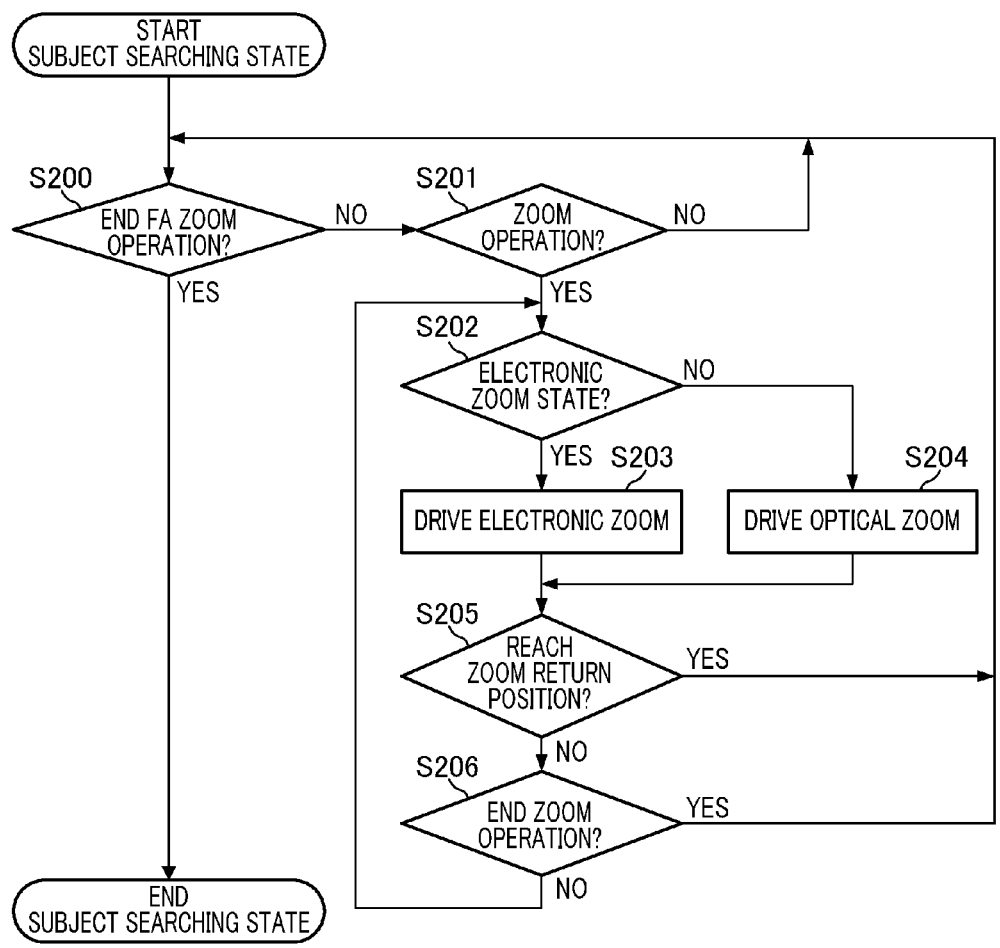
FIG. 6 is a flowchart describing an operation example during operation of the zoom during a subject searching state.
Figure 7:
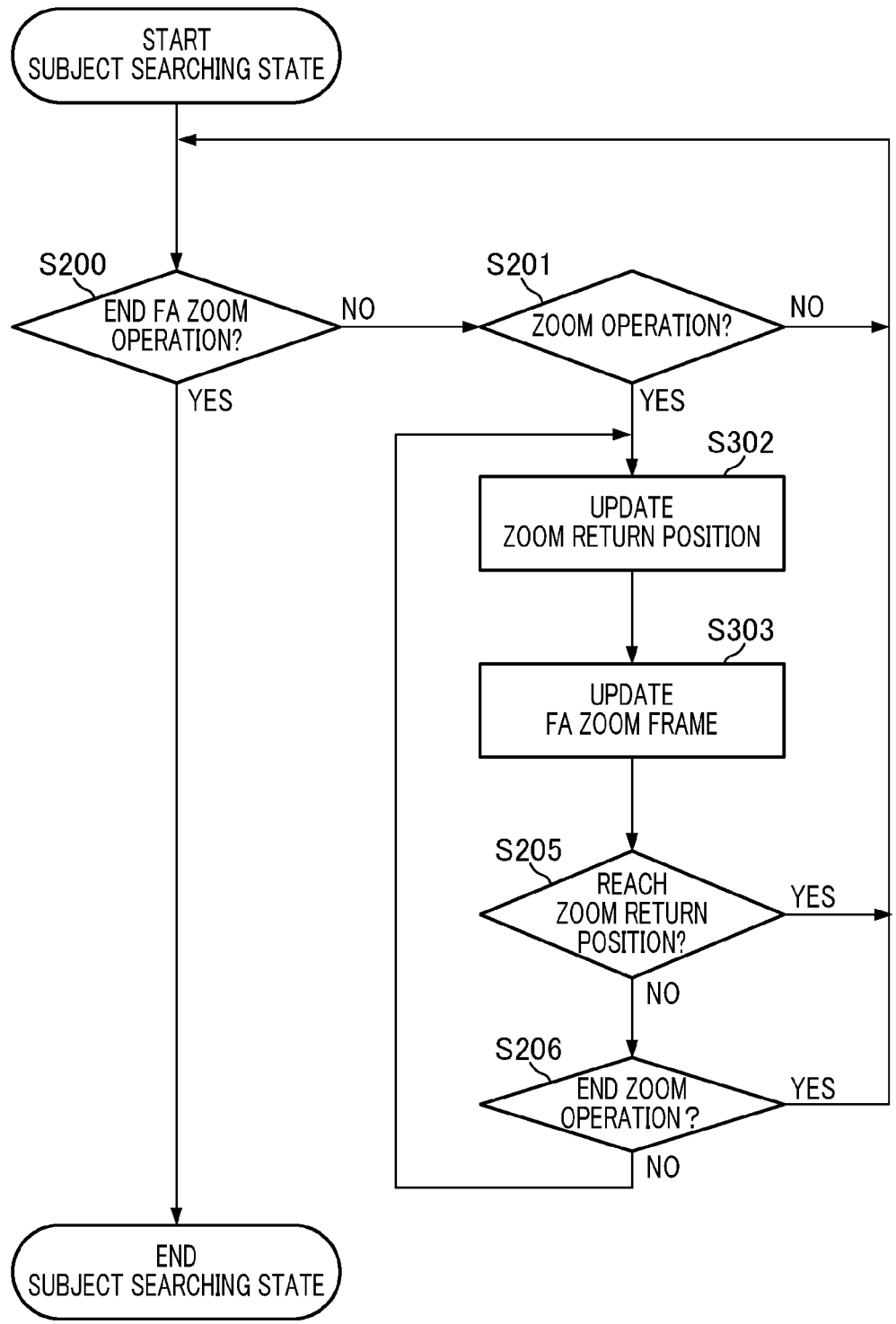
FIG. 7 is a flowchart describing a different operation example to that illustrated in FIG. 6.
Figure 8:
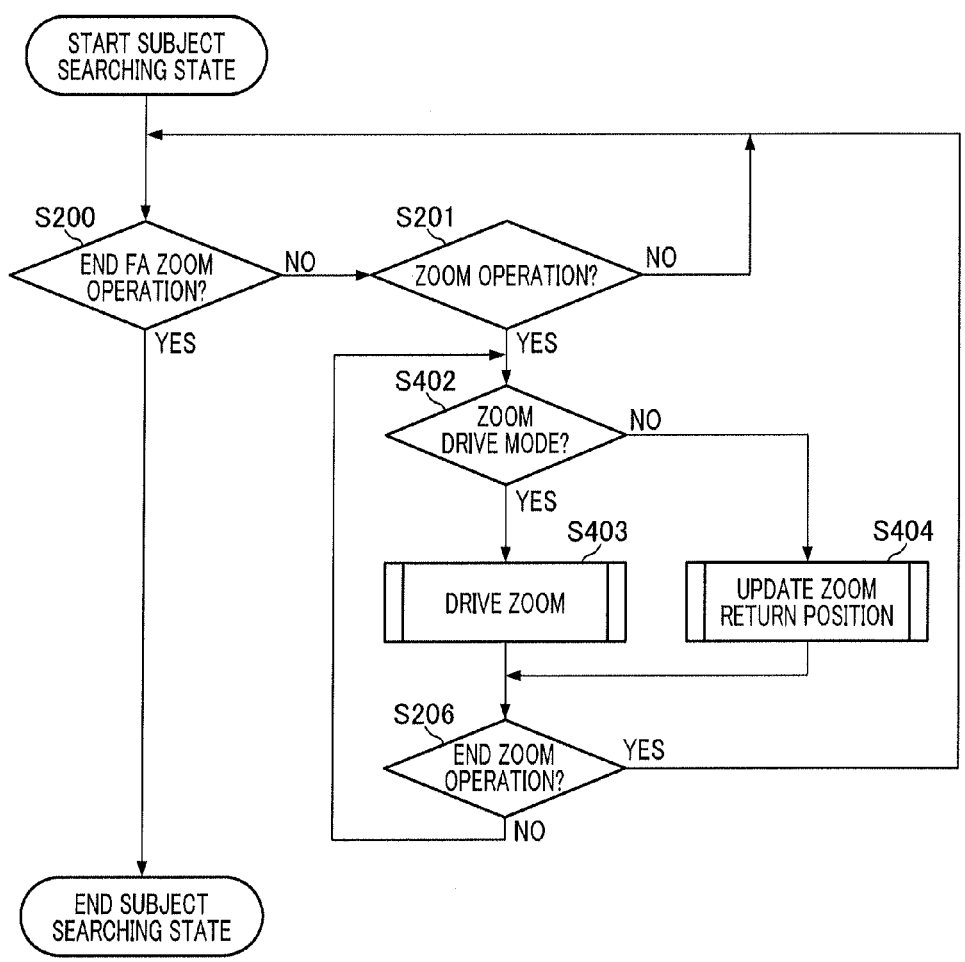
FIG. 8 is a flowchart describing an operation example enabling selection by a user of the operation illustrated in FIG. 6 or the operation illustrated in FIG. 7.

FIG. 6 to FIG. 8 are flowcharts describing an operation example when the user operates the zoom operation switch in a subject searching state, that is to say, in a zoom-out state before the completion of the FA zoom operation in S110 in FIG. 4 is determined.

FIG. 6 illustrates a process example of executing a zoom drive in the same manner as a zoom operation during an imaging preparation state, when the zoom operation switch is operated by the user in a subject searching state. In S200, the FA zoom control unit 122 determines whether or not the FA zoom operation switch of the operation unit 117 is in an OFF state, and when it is determined that the switch is in the OFF state, the subject searching state is terminated. When the FA zoom operation switch is in the ON state, the processing proceeds to S201, and the FA zoom control unit 122 determines whether or not the zoom operation switch has been operated in the subject searching state. When the zoom operation switch has been operated, the processing proceeds to S202, and when the switch has not been operated, the processing returns to S200. In S202, the FA zoom control unit 122 determines whether the zoom state at the present time is an electronic zoom state, or whether it is an optical zoom state. When in an electronic zoom state, the processing proceeds to S203, and when in an optical zoom state, the processing proceeds to S204.

In S203, the FA zoom control unit 122 executes an electronic zoom operation by transmitting a control command to the electronic zoom control unit 120. Furthermore, in S204, the FA zoom control unit 122 executes an optical zoom operation by transmitting a control command to the CZ control unit 119. In either case, a magnification variation operation is executed in the telephoto direction (telephoto angle direction) or the wide direction (wide-angle direction) in response to the direction of operation of the zoom operation switch, that is to say, a zoom-out direction or a zoom-in direction. After S203 or S204, the processing proceeds to S205, and when the zoom operation is executed in the telephoto direction in a zoom operation, the FA zoom control unit 122 determines whether or not the zoom position has reached the zoom return position that enables a zoom-in when the FA zoom operation is ended. When the zoom position reaches the zoom return position, the zoom operation is forcibly terminated, and the processing returns to S200. When the zoom position does not reach the zoom return position, the processing proceeds to S206. In S206, the FA zoom control unit 122 determines whether or not the zoom operation has been ended with reference to the state of depressing the zoom operation switch. When it is determined that the zoom operation is finished, the processing returns to S200. Alternatively, when it is determined that the zoom operation is continuing, the processing returns to S202, and the zoom operation is continued.

The processing illustrated in FIG. 6 enables effective narrowing of the range of the angle of view without shifting from a subject searching state, or enables relocation of a subject by instantaneous widening the angle of view by use of a zoom operation executed by the user, when the subject is not in-frame even though the frame is an angle of view in a subject searching state.

FIG. 7 illustrates a process example of varying the zoom return position when the zoom operation switch is operated by the user in a subject searching state. The points of difference from FIG. 6 are the processing steps in S302 and S303 that follow upon S201. Consequently, description will be omitted in relation to processing steps designated by the same step numbers as FIG. 6, and the points of difference will be described below.

When a zoom operation is executed in S201, the processing proceeds to S302, and the FA zoom control unit 122 updates the data for the zoom return position stored in the memory 118 in S101 of FIG. 4 in accordance with the direction of operation of the zoom operation switch. While the direction of operation of the zoom operation switch by the user is in the telephoto direction, data for the zoom return position is updated along the telephoto direction, and while the direction of operation is in the wide direction, data for the zoom return position is updated along the wide direction. Next, in S303, the FA zoom control unit 122 instructs the FA zoom frame control unit 121 to update the FA zoom frame. The FA zoom frame control unit 121 recalculates the size of the FA zoom frame in response to the zoom return position updated in S302, and updates the EVF display of the FA zoom frame. Then the processing proceeds to S205.

The processing illustrated in FIG. 7 responds to the need to adjust to angle of view when executing a zoom-in without shifting from a subject searching state when the size of the subject has changed after the time of the framing operation by the user in an imaging preparation state.

FIG. 8 illustrates an example of selectively executing the operation described in FIG. 6 and FIG. 7 when the zoom operation switch is operated by the user in a subject searching state. The points of difference from FIG. 6 are the processing steps in S402 to S404 that follow upon S201. Consequently, description will be omitted in relation to processing steps designated by the same step numbers as FIG. 6, and the points of difference will be described below.

In S402, the FA zoom control unit 122 determines the zoom operation mode in the subject searching state. When in zoom driving mode, the processing proceeds to S403, and the processing in S202 to S205 in FIG. 6 is executed. When in zoom return position variation mode, the processing proceeds to S404, and the processing in S205, S302 and S304 in FIG. 7 is executed. The mode setting includes a method of setting the mode through use by the user of a setting menu, or a method of setting the mode through use of an operation member allocated to the operation unit 117. After S403 and S404, the processing proceeds to S206.

User-friendly performance is enhanced since the processing illustrated in FIG. 8 enables selection of a zoom driving mode or a zoom return position variation mode by the user in the subject searching state.

Next, the processing for varying the zoom drive speed and the zoom drive amount when the digital camera 100 is fixed to a tripod and an FA zoom process is executed will be described. A tripod detection unit 123 illustrated in FIG. 1 detects whether or not the digital camera 100 is fixed to a tripod (not shown), and sends the detection result to the FA zoom control unit 122. For example, the method may determine that the camera is fixed to the tripod when a state is present in which a vibration level detected by a vibration detection apparatus used for detection of camera shake or the like is less than or equal to a threshold, and that state has continued for at least a reference time. Otherwise, a method may be used in which a detection switch is provided on the camera, and detects contact with the tripod.

Figure 9:
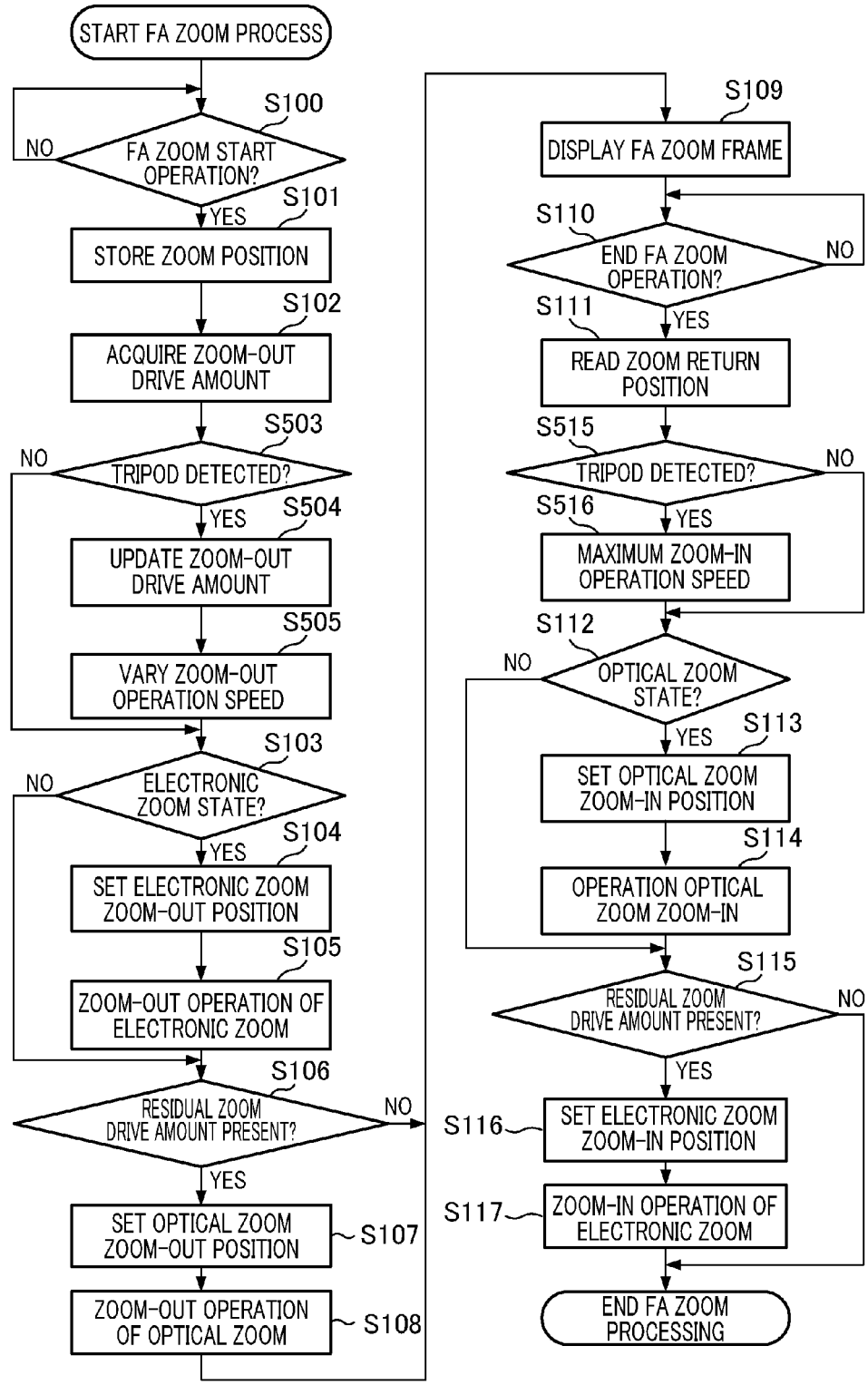
FIG. 9 is a flowchart describing a processing example of a zoom function according to an embodiment of the present invention when the camera is fixed to a tripod.

FIG. 9 is a flowchart illustrating an example of varying the zoom drive speed and the zoom drive amount. Note that the steps that are different from FIG. 4 are the processing steps in S503 and S505 that are executed between S102 and S103, and the processing steps in S515 and S516 that are executed between S111 and S112. The points of difference will be accordingly described below.

When the user executes an FA zoom process by manual operation of the digital camera 100, camera shake may preclude returning to the intended composition configuration. Furthermore, when a rapid change to the angle of view is executed during zoom-in or zoom-out, the user may again lose sight of the subject due to the timing of the camera shake. As a result, even when an FA zoom function is provided, there is a need for zoom speed control that enables a connectivity during zoom-in operations. However, when the FA zoom process is executed when the camera is fixed to a tripod, a change in the angle of view or falling out of frame of the subject as a result of a panning operation, camera shake or the like during a super telephoto operation can be effectively reduced. As a result, the zoom driving speed during zoom-in or zoom-out can be increased to a maximum value and the zoom-out driving amount can be varied.

In S503 that follows upon S102, the tripod detection unit 123 detects whether or not the digital camera 100 is fixed to the tripod. If the camera is fixed to the tripod when the FA zoom operation is started, the processing proceeds to S504, and when the camera is not fixed to the tripod, the processing proceeds to S103.

In S504, the FA zoom control unit 122 varies the zoom-out drive amount acquired in S102 to the zoom-out drive amount when fixed to the tripod. The zoom-out drive amount is set to a value that is larger than the value when imaging is executed without use of a tripod. Although this may be a preset value, variation within a predetermined range is possible by operation of the setting menu by the user. In S505, the FA zoom control unit 122 varies the zoom-out speed for execution of a zoom-out (the zoom drive speed during a zoom-out) to the zoom-out speed when fixed to a tripod. The zoom-out speed when fixed to a tripod is basically set to a maximum speed that is allowable during zoom drive control. However, a configuration is also possible in which the zoom-out speed can be varied within a predetermined range by operation of the setting menu by the user. The zoom-out speed when fixed to a tripod takes a larger value than the speed set when the camera is not fixed to a tripod.

In S515 that follows upon S111, the tripod detection unit 123 detects whether or not the digital camera 100 is fixed to the tripod. When it is detected that the camera is fixed to the tripod when the FA zoom operation is ended, the processing proceeds to S516. When it is detected that the camera is not fixed to the tripod, the processing proceeds to S112. In S516, the FA zoom control unit 122 varies the zoom-in speed when executing a zoom-in (the zoom drive speed during a zoom-in) to the zoom-in speed when fixed to a tripod. The zoom-in speed when fixed to a tripod is basically set to a maximum speed that is allowable during zoom drive control. However, a configuration is also possible in which the zoom-in speed can be varied within a predetermined range by operation of the setting menu by the user. The zoom-in speed when fixed to a tripod takes a larger value than the speed set when the camera is not fixed to a tripod.

According to the processing illustrated in FIG. 9, the user-friendly features of the camera use can be enhanced since prompt execution of operations is enabled by setting the zoom-out speed and the zoom-in speed to a maximum value during FA zoom operation when using a tripod. Furthermore in comparison to not using a tripod, advantages are realized in relation to searching by the user for the subject within a wider range by varying the zoom-out drive amount to a large value.

Second Embodiment

Next, a processing example will be described in which zoom driving at a higher speed is executed without performing an unnecessary electronic zoom during a framing assist. As disclosed in Japanese Patent Laid-Open No. 2006-50019, when driving the optical zoom independently from driving of the electronic zoom, it may be the case that the predetermined zoom position is not reached in a sufficiently short time. According to the present embodiment, even when the subject has moved out of frame, the user can image using a desired angle of view by immediately reacquiring the subject.

The gist of the present embodiment is to control the zoom units during operation of an operation instruction unit, such as the FA zoom operation switch or the like, to thereby drive the optical zoom unit and the electronic zoom unit when driving toward the optical zoom position and the electronic zoom position that correspond to the predetermined zoom position.

However, when the operation instruction unit is operating, it may not be the case that the optical zoom unit and the electronic zoom unit will actually be driven. For example, when operating the operation instruction unit, the zoom units are actually driven during operation of the operation instruction unit only when the optical zoom unit is driven and the enlargement ratio for zoom driving is smaller than the preset zoom magnification in a wide-angle direction. In this manner, high-speed zoom driving can be performed more accurately without an unnecessary electronic zoom operation when the operation instruction unit is operating. Furthermore, when the operation of the operation instruction unit is stopped, although control is executed to drive to the zoom position before operating the operation instruction unit, control is also enabled at this time to drive the optical zoom unit and the electronic zoom unit.

Figure 10:
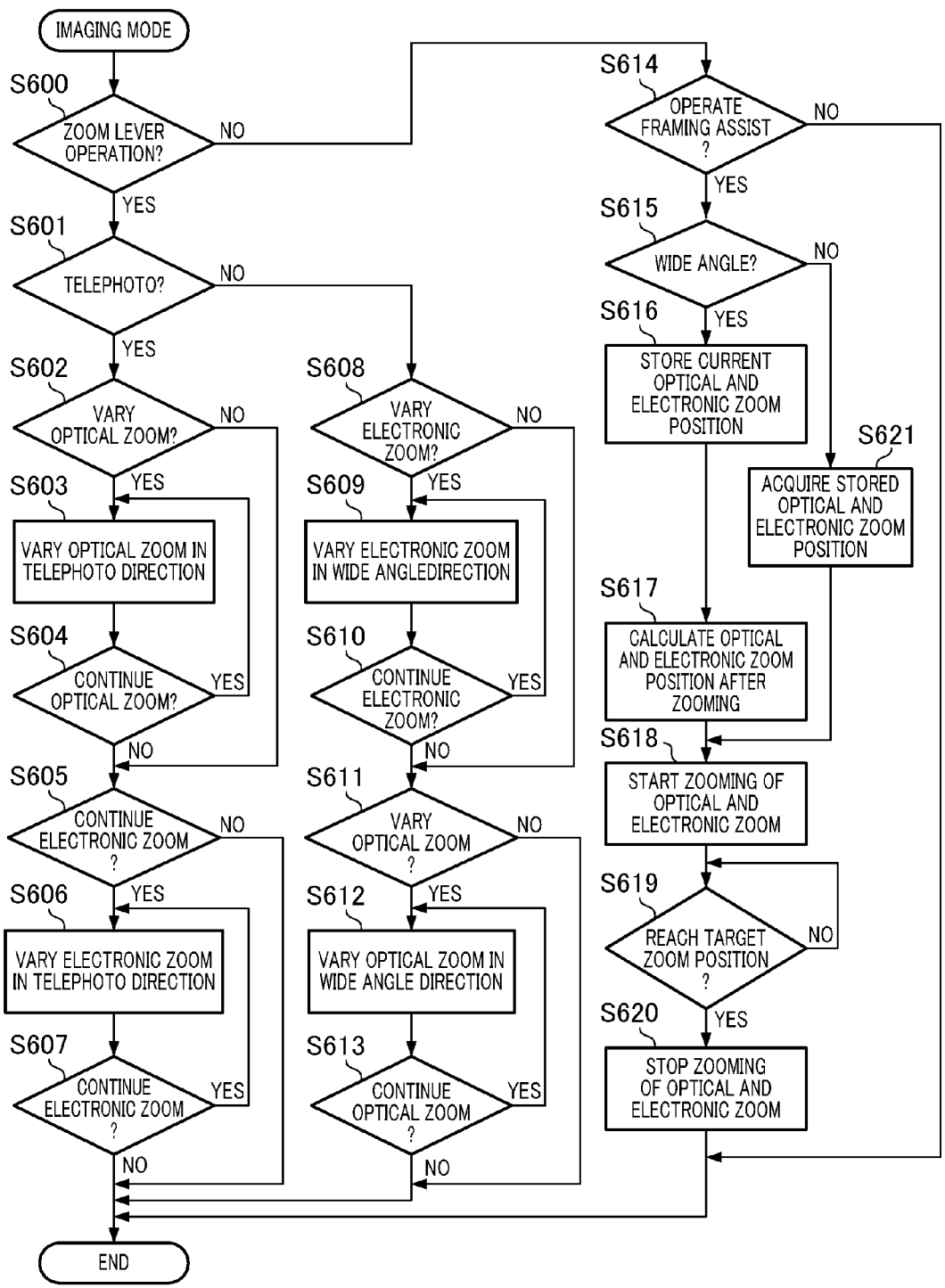
FIG. 10 is a flowchart describing the operation of the imaging apparatus according to an embodiment of the present invention.
Figure 11:
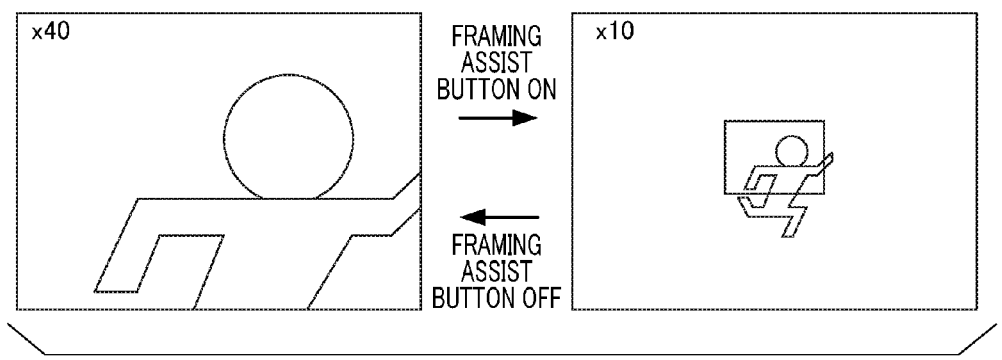
FIG. 11 is a schematic view illustrating an example of an LCD display during a framing assist.

An example of the processing executed when the zoom operation switch is operated and the processing executed when the FA zoom operation switch is operated will be described below referring to FIG. 10 to FIG. 12. The configuration in the present embodiment is generally the same as that illustrated in the block diagram in FIG. 1, and therefore the details will not be described for the sake of simplicity.

In S100, when the camera 100 starts imaging mode, the system control unit 114 determines whether or not the zoom operation switch that functions as the zoom operation instruction unit of the operation unit 117 is depressed. When depression of the zoom operation switch is detected, the processing proceeds to S101, and when the depression is not detected, the processing proceeds to S114. In S101, it is determined whether or not zooming in the telephoto direction (telephoto angle direction) has been instructed by the zoom operation switch. When zooming is instructed in the telephoto (telephoto angle direction) direction, the processing proceeds to S102, and when zooming is instructed in the wide direction (wide-angle direction), the processing proceeds to S108. In S102, it is determined whether or not a zoom-in operation is executed by the optical zoom. When a zoom-in is executed, the processing proceeds to S103, and when a zoom-in is not executed, the processing proceeds to S105. At this point, it is determined whether the zoom lens 102 has reached the telephoto end. When the lens has reached the telephoto end, it is determined that a zoom-in operation will not be executed. In S104, it is determined whether the zoom operation by the zoom operation switch is continuing, and whether the zoom lens 102 has reached the telephoto end. When the optical zoom is continuing, the processing returns S103, and when the optical zoom is not continuing, the processing proceeds to S105.

In S105, it is determined whether or not to execute a zoom-in operation with the electronic zoom. When the zoom-in operation is executed, the processing proceeds to S106, and when the zoom-in operation is not executed, the processing is ended. At this point, it is determined to vary the zoom with the electronic zoom when a zoom operation caused by the zoom operation switch is continued and the zoom lens 102 is at the telephoto end. In S106, the electronic zoom is varied in the telephoto direction. At this point, a segmenting and enlarging process is executed by the image processing circuit 107 in relation to an image that is read from the image memory 108, and re-stored in the image memory 108. The enlarged image is displayed on the display unit 109. The angle of view can be varied in a smooth manner by gradually narrowing the range in which the segmenting and enlarging operation is executed. A zoom-in operation using the electronic zoom is executed in response to an instruction from the system control unit 114 upon receipt of an instruction from the zoom operation switch to thereby control the electronic zoom control unit 120, the image processing circuit 107, the image memory 108, and the display unit 109. In S107, it is determined whether the zoom-in operation caused by the zoom operation switch is continuing, and whether the enlargement of the image by the electronic zoom has not reached the predetermined magnification. When the electronic zoom is continuing, the processing returns to S106, and when the electronic zoom is not continuing, the processing is ended.

In S101, when the zoom operation switch orders a zoom-out operation in a wide direction, in S108, it is determined whether or not to execute a zoom-out operation with the electronic zoom. When the zoom-out operation is executed, the processing proceeds to S109, and when the zoom-out operation is not executed, the processing proceeds to S111. At this point, it is determined whether or not the enlargement of the image by the electronic zoom is executed, and when an enlargement of the image is executed with the electronic zoom, it is determined to execute a zoom-out operation. In S109, the electronic zoom is varied to the wide end. At this point, the angle of view can be varied in a smooth manner by gradually expanding the range of the segmenting and enlarging operation by the image processing circuit 107. In S110, it is determined whether the zoom-out operation using the zoom operation switch is continuing, and whether the enlargement of the image by the electronic zoom has not been released. When the electronic zoom is continuing, the processing returns to S109, and when the electronic zoom is not continuing, the processing proceeds to S111.

In S111, it is determined whether or not the zooming is performed using the optical zoom, and when a zoom-out operation is executed, the processing proceeds to S112. When a zoom-out operation is not executed, the processing is ended. At this point, it is determined to vary the zoom when a zoom operation due to the zoom operation switch is continuing and the zoom lens 102 is not at the wide end. In S112, the zoom lens 102 is displaced in the wide direction by the zoom lens drive unit. In S113, it is determined whether the zoom operation using the zoom operation switch is continuing, and whether the zoom lens 102 is not at the wide end. When the optical zoom is continuing, the processing returns to S112, and when the optical zoom is not continuing, the processing is ended.

In S100, when the zoom operation switch is not operated, the FA zoom control unit 122 in S114 determines whether or not the FA zoom operation switch of the operation unit 117 is depressed. When the depression of the FA zoom operation switch is detected, the processing proceeds to S115, and when the depression of the FA zoom operation switch is not detected, the processing is ended. In S115, the FA zoom control unit 122 determines whether the operation is a depression operation or a release operation of the FA zoom operation switch. When a depression operation is detected, it is determined to perform a zoom-out in the wide direction, and the processing proceeds to S116, and when a release operation, a zoom-in in the telephoto direction is determined, and the processing proceeds to S121. In S116, the current position of the zoom lens 102 and the current enlargement ratio of the image by the electronic zoom are respectively stored in the memory 118.

In S117, the optical zoom position of the zoom lens 102 after zooming of the zoom lens 102 and the electronic zoom position at the enlargement ratio of the image by the electronic zoom are respectively calculated to execute a zoom-out in a wide direction using a preset magnification. The setting zoom position at the preset magnification that executes zoom drive during operation of the FA zoom operation switch that is the operation instruction unit can be changed. When the current position of the zoom lens 102 is not at the telephoto end (when an enlargement of the image using the electronic zoom is not executed), the electronic zoom position does not vary even after the zoom-out. Furthermore, when the current enlargement ratio of the image by the electronic zoom is larger than the zoom magnification to the preset wide end, the optical zoom position does not vary even after the zoom-out. The position of the optical zoom and the position of the electronic zoom after a zoom-out both vary only when an enlargement of the image is executed by the electronic zoom and the enlargement ratio is smaller than the preset zoom magnification in the wide angle direction.

In S118, a zoom-out is started towards the optical zoom position and the electronic zoom position calculated in S117. At the same time as the startup of displacement of the zoom lens 102 to the wide end, the range in which segmenting and enlarging of the image is executed by the electronic zoom is gradually expanded. As a result, zooming of the optical zoom and the electronic zoom is simultaneously realized. As described above, when the optical zoom position after the zoom-out in the calculation in S117 does not change, zooming of the optical zoom is not executed. Furthermore, when the optical zoom position after the zoom-out in the calculation in S117 does not change, zooming of the electronic zoom is not executed. In S119, it is determined whether or not the optical zoom and the electronic zoom have reached the position calculated in S117. When the position has been reached, the processing proceeds to S120, and when not reached, the processing returns to S119. In S120, the zooming of the optical zoom and the electronic zoom is stopped, and the processing is ended.

When it is determined in S115 that a release operation is performed on the FA zoom operation switch, the processing proceeds to S121, and the optical zoom position and the electronic zoom position that were stored in the memory 118 in S116 are acquired. In S118, a zoom-in is started towards the optical zoom position and the electronic zoom position acquired in S121. At the same time as the zoom lens 102 starts to displace to the telephoto end, the range in which segmenting and enlarging of the image is executed by the electronic zoom is gradually expanded. As a result, zooming of the optical zoom and the electronic zoom is simultaneously realized. When the current optical zoom position does not vary from the optical zoom position acquired in S121, displacement of the optical zoom is not executed. Furthermore, when the current electronic zoom position does not vary from the optical zoom position acquired in S121, displacement of the electronic zoom is not executed. In S119, it is determined whether or not the optical zoom and the electronic zoom have reached the position acquired in S121. When the position has been reached, the processing proceeds to S120, and when it is not reached, the processing returns to S119. In S120, the displacement of the optical zoom and the electronic zoom is stopped, and the processing is ended. FIG. 11 illustrates an example of an LCD display during a framing assist according to the present embodiment. In FIG. 11, since the FA zoom operation switch is in the ON position at a 40× zoom position, a zoom-out is executed in a wide-angle direction by only the preset magnification to thereby reach a 10× zoom position (the zoom position of the preset magnification). For example, after the subject is re-entered into the angle of view, and the FA zoom operation switch is placed in the OFF position, the optical zoom and the electronic zoom are driven to the telephoto end, and return to the original 40× zoom position.

As described above, according to the present embodiment, the optical zoom and the electronic zoom are independently driven when displacing the zoom position with the zoom operation switch, and the optical zoom and the electronic zoom are driven at the same time when displacing the zoom position with the FA zoom operation switch. As a result, a predetermined zoom position can be rapidly reached during a framing assist. Furthermore, deterioration in image quality is low since displacement of the electronic zoom is executed only when required.

Figures 1A, 12:
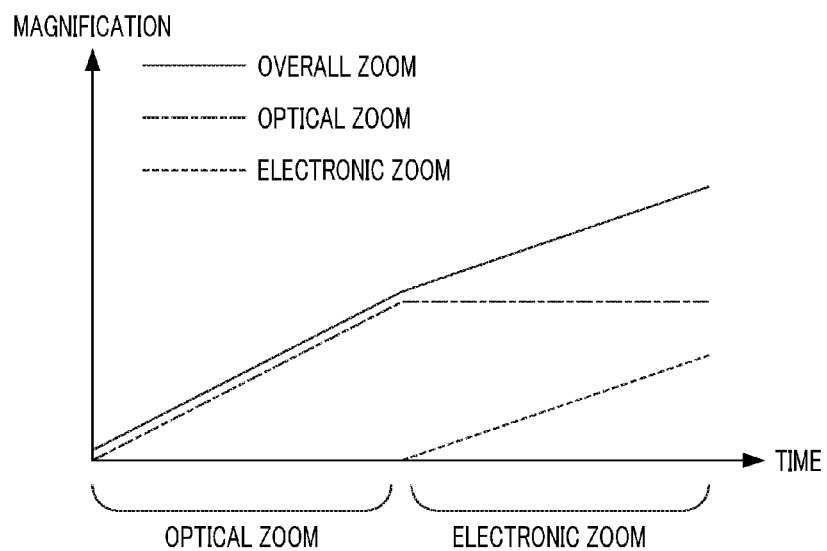
FIG. 12-1A illustrates the relationship between magnification and time during zooming by operation of a zoom operation switch.
Figures 1B, 12:
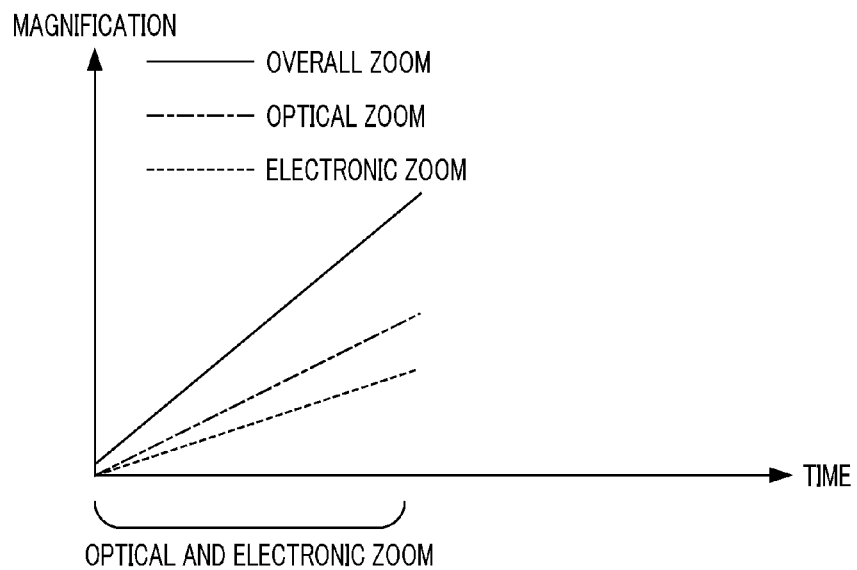

FIG. 12-1A illustrates the relationship between magnification and time during zoom displacement by operation of the zoom operation switch according to the present embodiment. During displacement of the zoom by the zoom operation switch, since the optical zoom and the electronic zoom are driven independently, the time required for displacement of the zoom is relatively long. FIG. 12-1B illustrates the relationship between magnification and time during zoom displacement by operation of the FA zoom operation switch according to the present embodiment. During displacement of the zoom by the FA zoom operation switch, since the optical zoom and the electronic zoom are driven at the same time towards the predetermined zoom position, the time required for displacement of the zoom can be reduced.

Third Embodiment

Next, the operation of the imaging apparatus according to the third embodiment of the present invention will be described making reference to FIG. 12-2C, FIG. 12-2D and FIG. 12-3. As described above, the optical zoom and the electronic zoom are driven at the same time when displacing the zoom with the FA zoom operation switch. At that time, the time required by the optical zoom to reach the predetermined calculated optical zoom position may be different from the time required by the electronic zoom to reach the predetermined calculated electronic zoom position. The actual method of operation of the optical zoom and the electronic zoom will be described below.

Figures 2C, 12:
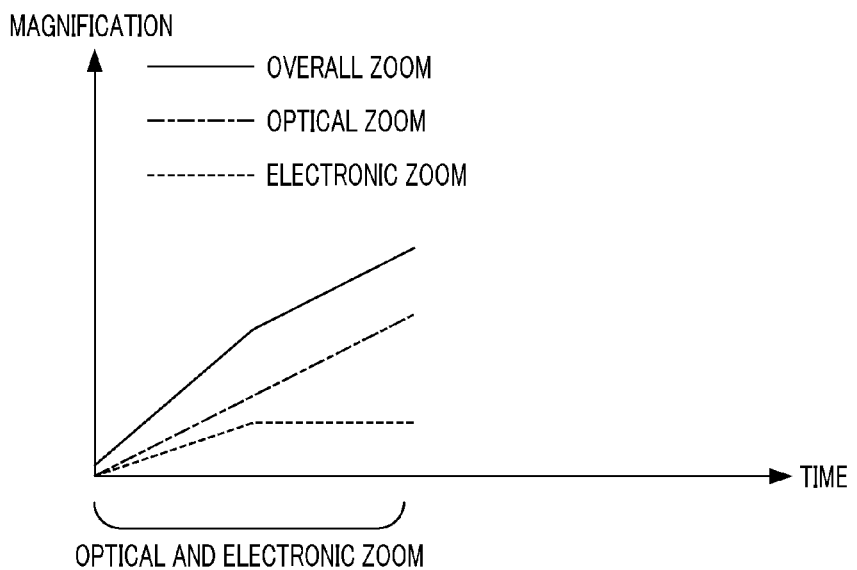

Firstly, the situation in which the electronic zoom reaches the predetermined zoom position more rapidly than the optical zoom will be described. In the imaging apparatus according to the present embodiment, as illustrated in FIG. 12-2C, zooming of the optical zoom and the electronic zoom starts at the same time. When the electronic zoom reaches the predetermined calculated electronic zoom position, zooming of the electronic zoom is stopped, and only zooming of the optical zoom is continued. Thereafter, when the optical zoom reaches the predetermined calculated optical zoom position, zooming of the optical zoom is stopped.

Figures 2D, 12:
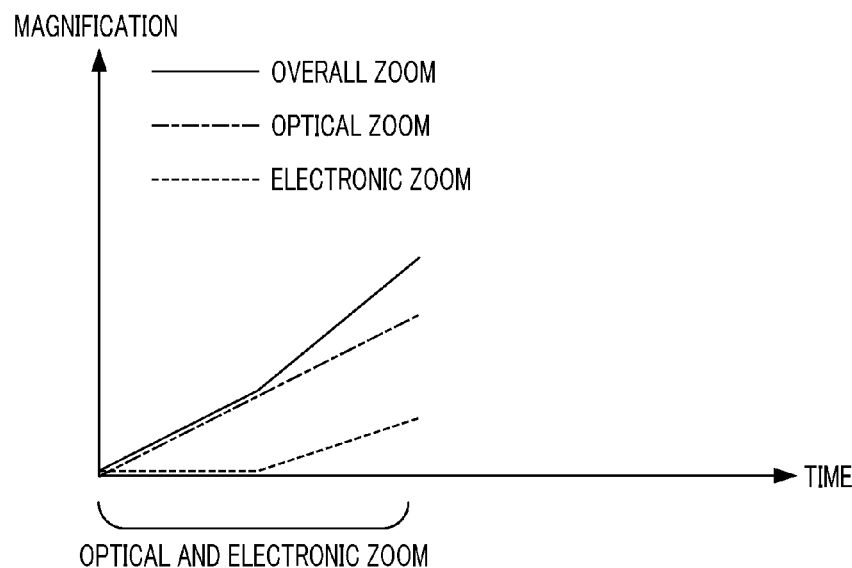
Figures 3, 12:
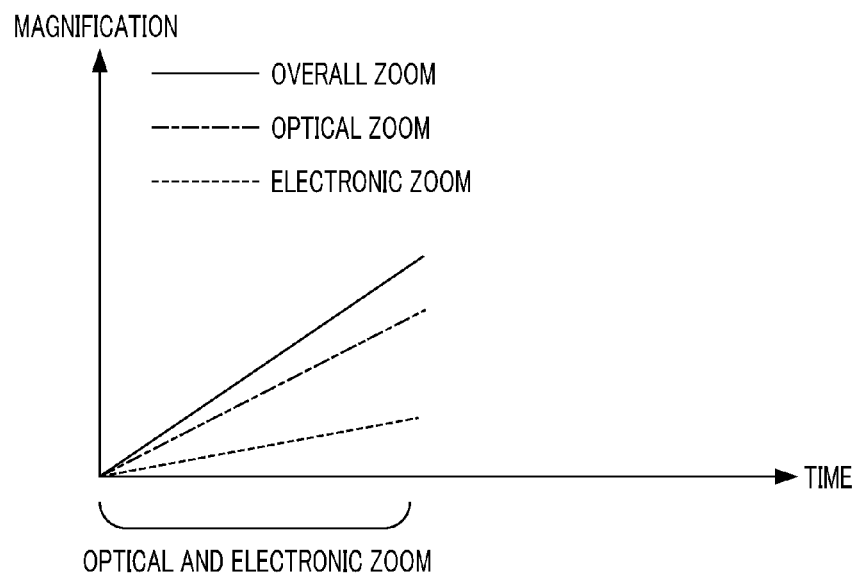

In the modified example illustrated in FIG. 12-2D, the optical zoom and the electronic zoom may be stopped at the same time. In this case, it is necessary to calculate the time period of zooming the optical zoom and the time period of zooming the electronic zoom in advance, and then determine the timing during the optical zooming at which zooming of the electronic zoom is commenced. Furthermore, as illustrated in FIG. 12-3, the electronic zoom speed may be regulated so that the start up and stopping of a zoom operation by the optical zoom and the electronic zoom are executed at the same time. In this case, it is necessary to calculate the time period of zooming the optical zoom in advance, and calculate the electronic zoom speed so that the electronic zoom reaches the predetermined zoom position at the same time period of zooming. As described above, the present invention can be applied even when the time taken by the optical zoom and the electronic zoom to reach the predetermined zoom position is different.

Although the preferred embodiments of the present invention have been described, various modifications and changes are possible within the scope of the present invention. For example, in the present embodiment, although the electronic zoom is prioritized in the zoom-out operation in FIG. 4, a configuration in which the optical zoom is prioritized is also possible. In this case, it is determined whether the zoom position at the time stored in the memory 118 is within the optical zoom region. Then, when the zoom position calculated in accordance with the zoom-out driving amount in the optical zoom region crosses over the zoom regions to thereby reach the electronic zoom region, a variation towards the zoom position is executed in accordance with the zoom-out drive amount of the calculated residual amount. In the above embodiment, the operation instruction unit was exemplified by maintaining an subject searching state in the period in which the FA zoom operation switch is depressed, and instructing the camera to stop FA zoom operation in response to release of the switch. However the invention is not limited in this respect, and an operation instruction unit may be used in which the FA zoom is started by releasing of the FA zoom operation switch after depression of the switch, and the FA zoom operation is ended by releasing the operation by depressing the switch again. Furthermore, the operation instruction unit maybe used in which a plurality of buttons are combined to thereby instruct startup or ending by combining the FA zoom operation switch with the zoom operation switch.

While the embodiments of the present invention have been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2010-204563 filed Sep. 13, 2010, and Japanese Patent Application No. 2011-074757 filed Mar. 30, 2011 which are hereby incorporated by reference herein in their entirety.

What is claimed is:

1. An imaging apparatus comprising:
 a first zoom operation unit for changing zoom magnification step by step according to a manual operation;
 a second zoom operation unit for changing a zoom magnification by a predetermined zoom-out magnification ratio larger than the step by the first zoom operation unit; and
 a control unit configured to control the zoom magnification in response to the operation with the first or second operation unit,
 wherein in response to a first operation with the second operation unit, the control unit is configured to store a current zoom magnification as a first magnification, determine a second magnification based on the predetermined zoom-out magnification ratio from the current zoom magnification, and change the zoom magnification from the current zoom magnification to the second magnification in a wide-angle direction, and
 wherein in response to a second operation, different from the first operation, with the second operation unit, the control unit is configured to change the zoom magnification from the second magnification to the first magnification.

2. The imaging apparatus according to claim 1, wherein, in response to the first operation, the control unit changes the zoom magnification to the second magnification, and displays a frame indicator indicating an angle of view corresponding to the first magnification on a display unit.

3. The imaging apparatus according to claim 1 further comprising:
 a drive unit configured to drive a zoom lens,
 wherein the control unit acquires a drive amount of the zoom lens for changing the zoom magnification to the second magnification as a continuous amount based on the zoom magnification or as a discrete amount based on a zoom step number.

4. The imaging apparatus according to claim 1 further comprising:
 a drive unit configured to drive a zoom lens,
 wherein the control unit is configured to change the zoom magnification by controlling of driving the zoom lens via the drive unit in an optical zoom region and change the zoom magnification by an imaging process in an electronic zoom region.

5. The imaging apparatus according to claim 4, wherein when the first magnification is in the optical zoom region, and the second magnification is in the electrical zoom region, the control unit is configured to change the zoom magnification in the optical zoom region and then to change the zoom magnification towards the electrical magnification within the second zoom region.

6. The imaging apparatus according to claim 1, further comprising:
 a second operation unit, different from the first operation unit, configured to accept an operation for changing a zoom magnification toward a direction instructed by a user,
 wherein the control unit is configured to change the zoom magnification in accordance with the direction instructed via the second operation unit before the second operation.

7. The imaging apparatus according to claim 1,
 wherein the control unit is configured to change the stored first magnification in accordance with the direction instructed with the first operation unit if the first operation unit is operated after the first operation with the second operation unit and before the second operation with the second operation unit.

8. The imaging apparatus according to claim 1, further comprising:
 a detection unit configured to detect whether or not the imaging apparatus is fixed to an external equipment,
 wherein, when the detection unit detects that the imaging apparatus is fixed to the external equipment, the control unit is configured to set the second magnification in a wider-angle than the second magnification that is set when the detection unit detects that the imaging apparatus is not fixed to the external equipment.

9. The imaging apparatus according to claim 1, further comprising:
 a detection unit configured to detect whether or not the imaging apparatus is fixed to an external equipment,
 wherein, when the detection unit detects that the imaging apparatus is fixed to the external equipment, the control unit is configured to set zoom speed for changing the zoom magnification in response to the first operation or the second operation larger than the zoom speed that is set when the detection unit detects that the imaging apparatus is not fixed to the external equipment.

10. The imaging apparatus according to claim 1,
 wherein the control unit is configured to control an optical zoom operation first and then an electronic zoom operation when changing the zoom magnification is instructed with the first operation unit, and permit to control the optical zoom operation and the electronic zoom operation at the same time when changing the zoom magnification is instructed with the second operation unit.

11. The imaging apparatus according to claim 10, wherein, in response to the first operation or the second operation via the second zoom operation unit, the control unit is configured to control the optical zoom operation and the electronic zoom operation at the same time.

12. The imaging apparatus according to claim 11, wherein the control unit is configured to control the optical zoom operation and the electronic zoom operation at the same time when the control unit changes the zoom magnification by the electronic zoom operation and zoom magnification ratio for the electronic zoom operation is smaller than zoom magnification ratio to the first magnification or the second magnification.

13. An imaging apparatus comprising:
 a first zoom operation unit for changing zoom position step by step according to a manual operation;
 a second zoom operation unit for changing a zoom position by a predetermined zoom-out ratio larger than the step by the first zoom operation unit; and
 a control unit configured to control the zoom position in response to the operation with the first or second operation unit,
 wherein in response to a first operation with the second operation unit, the control unit is configured to store a current zoom position as a first magnification, determine a second position based on the predetermined zoom-out ratio from the current zoom position, and change the zoom position from the current zoom position to the second position in a wide-angle direction, and wherein in response to a second operation, different from the first operation, with the second operation unit, the control unit is configured to change the zoom position from the second position to the first magnification.

14. The imaging apparatus according to claim 13, wherein, in response to the first operation, the control unit changes the zoom position to the second position, and displays a frame indicating an angle of view corresponding to the first position on a display unit.

15. The imaging apparatus according to claim 13 further comprising:
a drive unit configured to drive a zoom lens,
wherein the control unit acquires a drive amount of the zoom lens for changing the zoom position to the second position as a continuous amount based on the zoom position or as a discrete amount based on a zoom step number.

16. The imaging apparatus according to claim 13 further comprising:
a drive unit configured to drive a zoom lens,
wherein the control unit is configured to change the zoom position by controlling of driving the zoom lens with the drive unit in an optical zoom region and change the zoom position by an imaging process in an electronic zoom region.

17. The imaging apparatus according to claim 16, wherein when the first position is in a first zoom region corresponding to a priority zoom state, and the second position is in a second zoom region corresponding to another zoom state, the control unit is configured to change the zoom position in the first zoom region and calculate a residual amount of changing the zoom position to change towards the second position within the second zoom region.

18. The imaging apparatus according to claim 13,
wherein the control unit is configured to change the stored first magnification in accordance with the direction instructed with the first operation unit if the first operation unit is operated after the first operation with the second operation unit and before the second operation with the second operation unit.

19. The imaging apparatus according to claim 13, further comprising:
a detection unit configured to detect whether or not the imaging apparatus is fixed to an external equipment,
wherein, when the detection unit detects that the imaging apparatus is fixed to the external equipment, the control unit is configured to set the second magnification in a wider-angle than the second magnification that is set when the detection unit detects that the imaging apparatus is not fixed to the external equipment.

20. The imaging apparatus according to claim 13, further comprising:
a detection unit configured to detect whether or not the imaging apparatus is fixed to an external equipment,
wherein, when the detection unit detects that the imaging apparatus is fixed to the external equipment, the control unit is configured to set zoom speed for changing the zoom magnification in response to the first operation or the second operation larger than the zoom speed that is set when the detection unit detects that the imaging apparatus is not fixed to the external equipment.

21. The imaging apparatus according to claim 1,
wherein the control unit is configured to control an optical zoom operation first and then an electronic zoom operation when changing the zoom magnification is instructed with the first operation unit, and permit to control the optical zoom operation and the electronic zoom operation at the same time when changing the zoom magnification is instructed with the second operation unit.

22. The imaging apparatus according to claim 21, wherein, in response to the first operation or the second operation via the second zoom operation unit, the control unit is configured to control the optical zoom operation and the electronic zoom operation at the same time.

23. The imaging apparatus according to claim 22, wherein the control unit is configured to control the optical zoom operation and the electronic zoom operation at the same time when the control unit changes the zoom position by the electronic zoom operation and zoom magnification ratio for the electronic zoom operation is smaller than zoom magnification ratio to the first position or the second position.

24. The imaging apparatus according to claim 1, wherein the second magnification is limited by a magnification correspond to wide end of the imaging apparatus.

25. The imaging apparatus according to claim 1, wherein the predetermined zoom-out magnification ratio is a fixed ratio unless the second magnification reaches a wide end of the imaging apparatus, the current zoom magnification.

26. The imaging apparatus according to claim 1, wherein the predetermined zoom-out magnification ratio is variably set by a user.

27. The imaging apparatus according to claim 1, wherein the control unit is configured to keep the zoom magnification at the second magnification until the second operation with the second operation unit.

28. The imaging apparatus according to claim 1, wherein the zoom magnification includes optical zoom magnification and electrical zoom magnification.

* * * * *